(12) United States Patent
Cordesses et al.

(10) Patent No.: US 7,660,703 B2
(45) Date of Patent: Feb. 9, 2010

(54) DEVICE AND METHOD FOR PROCESSING A SIGNAL OF PRESSURE MEASUREMENT OF AN INTERNAL COMBUSTION ENGINE COMBUSTION CHAMBER

(75) Inventors: Lionel Cordesses, Montigny-le-Bretonneux (FR); Marco Marsilia, Issy-les-Moulineaux (FR)

(73) Assignee: Renault S.A.S., Billancourt (FR)

( * ) Notice: Subject to any disclaimer, the term of this patent is extended or adjusted under 35 U.S.C. 154(b) by 0 days.

(21) Appl. No.: 11/994,652

(22) PCT Filed: Jun. 21, 2006

(86) PCT No.: PCT/FR2006/050616

§ 371 (c)(1),
(2), (4) Date: May 28, 2008

(87) PCT Pub. No.: WO2007/006988

PCT Pub. Date: Jan. 18, 2007

(65) Prior Publication Data

US 2008/0228447 A1    Sep. 18, 2008

(30) Foreign Application Priority Data

Jul. 7, 2005    (FR) .................................. 05 07264

(51) Int. Cl.
*G06F 19/00* (2006.01)
(52) U.S. Cl. ...................................................... 702/190
(58) Field of Classification Search ................. 702/190, 702/24, 25, 69–71, 125, 138, 189, 193, 195; 123/435; 73/116.03
See application file for complete search history.

(56) References Cited

U.S. PATENT DOCUMENTS

| 5,109,820 | A | | 5/1992 | Iwata et al. | |
|---|---|---|---|---|---|
| 5,584,276 | A | * | 12/1996 | Tomisawa | 123/406.24 |
| 5,682,856 | A | * | 11/1997 | Tomisawa et al. | 123/406.22 |
| 7,000,596 | B2 | * | 2/2006 | Zurloye et al. | 123/435 |
| 7,010,283 | B2 | * | 3/2006 | Matsumoto et al. | 455/226.1 |
| 7,073,485 | B2 | * | 7/2006 | Truscott et al. | 123/406.22 |
| 7,184,937 | B1 | * | 2/2007 | Su et al. | 702/189 |
| 7,317,800 | B1 | * | 1/2008 | Vierthaler et al. | 381/61 |
| 7,472,687 | B2 | * | 1/2009 | Zhu et al. | 123/406.34 |

(Continued)

FOREIGN PATENT DOCUMENTS

EP    1 132 605    9/2001

(Continued)

OTHER PUBLICATIONS

English Abstract of Miyabe, JP 2004-102161, Feb. 2004.*

*Primary Examiner*—Michael P. Nghiem
*Assistant Examiner*—Cindy H Khuu
(74) *Attorney, Agent, or Firm*—Oblon, Spivak, McClelland, Maier & Neustadt, L.L.P.

(57) ABSTRACT

A device for processing a signal of pressure measurement of an internal combustion engine combustion chamber. The device obtains, by a low-pass filter of the pressure measuring signal, a filtered signal, subtracts the filtered signal from the pressure measuring signal to obtain a difference signal, compares the difference signal to a predetermined threshold value, and determines a combustion starting time as a time at which the difference signal reaches the predetermined threshold value.

10 Claims, 2 Drawing Sheets

U.S. PATENT DOCUMENTS

| | | | |
|---|---|---|---|
| 2001/0022084 A1* | 9/2001 | Koelle et al. | 60/602 |
| 2003/0010101 A1* | 1/2003 | Zur Loye et al. | 73/116 |
| 2003/0145829 A1* | 8/2003 | Scholl et al. | 123/435 |
| 2004/0040285 A1* | 3/2004 | Strohmaier et al. | 60/277 |
| 2005/0251369 A1* | 11/2005 | DeCarlo et al. | 702/190 |
| 2006/0245517 A1* | 11/2006 | Ikedo et al. | 375/297 |
| 2007/0186902 A1* | 8/2007 | Zhu et al. | 123/406.34 |

FOREIGN PATENT DOCUMENTS

| | | |
|---|---|---|
| FR | 2 765 275 | 12/1998 |

\* cited by examiner

DEVICE AND METHOD FOR PROCESSING A SIGNAL OF PRESSURE MEASUREMENT OF AN INTERNAL COMBUSTION ENGINE COMBUSTION CHAMBER

BACKGROUND OF THE INVENTION

I. Field of the Invention

The present invention relates to a device for processing a pressure-measurement signal of a combustion chamber of an internal combustion engine with a view to determining an instant of start of combustion. It also relates to a method employed by this device.

II. Description of Related Art

Such a device is the object of the American patent application published under the number U.S. 2003/0145829. In that document, the pressure-measurement signal is processed by means of a wavelet transformation. An analysis of the coefficients of the wavelet transformation of the pressure-measurement signal makes it possible to detect an instant of start of combustion. More precisely, a sudden increase of the absolute values of these coefficients constitutes an indicator of the instant of start of combustion.

Such processing of the pressure-measurement signal, which consumes considerable computing time, is costly and is difficult to install in a traditional engine control computer.

BRIEF SUMMARY OF THE INVENTION

The invention seeks to remedy this disadvantage by providing a device capable of determining an instant of start of combustion by means of simple processing of the pressure-measurement signal.

The object of the invention is therefore a device for processing a pressure-measurement signal of a combustion chamber of an internal combustion engine with a view to determining an instant of start of combustion, characterized in that it comprises:
- a low-pass filter for obtaining a filtered signal from the pressure-measurement signal, and means for subtracting the filtered signal from the pressure-measurement signal to obtain a difference signal,
- means for comparing the difference signal with a predetermined threshold value, and
- means for determining an instant of start of combustion as the instant at which the difference signal attains the predetermined threshold value.

The processing applied to the pressure-measurement signal is effectively simple, since it involves low-pass filtering, and mere comparison of the difference between the filtered signal and the original signal with a predetermined threshold value makes it possible reliably to determine the instant of start of combustion.

In one possible embodiment of the invention, the low-pass filter is provided with digital means for first-order low-pass filtering, and the comparison means are provided with a digital comparator.

Digital implementation of the invention is possible, since the processing operations applied to the pressure-measurement signal are simple. The traditional engine control computers are capable of supporting such processing operations. In addition, the merit of digital implementation is that it allows reliable and predictable results to be obtained by simulation. Furthermore, adjustment of the device parameters is simple.

Optionally, the digital parameters of the low-pass filter and the comparison means are chosen in such a way that only operations between integral numbers are generated during processing of the pressure-measurement signal.

Also optionally, the digital parameters of the low-pass filter and the comparison means are chosen in such a way that any division of an integral number is replaced by displacement of its binary representation to the right during processing of the pressure-measurement signal.

In this way the digital operations are facilitated and processing thereof is correspondingly simplified.

In this embodiment also, the low-pass filter can be provided with a digital Euler integrator. Such a digital integrator is simple to use.

Advantageously, the device for processing a pressure-measurement signal is provided with a nonlinear processing element disposed in such a way as to broaden the pass band of the low-pass filter when the difference signal attains the predetermined threshold value.

In this way, it is possible to detect a possible second instant of start of combustion after detection of a first instant of start of combustion.

In another possible embodiment of the invention, the low-pass filter is provided with analog means for first-order low-pass filtering, and the nonlinear processing element is provided with a diode connected in parallel with the low-pass filter.

The advantage of such an analog embodiment is its cost.

In this embodiment, the device for processing a pressure-measurement signal can be provided with an analog circuit of the comparator type in order to deliver a step signal that changes from a zero value to a nonzero value when the difference signal exceeds the predetermined threshold value.

This step signal constitutes an alarm that can trigger subsequent processing steps.

Another object of the invention is a method for processing a pressure-measurement signal of a combustion chamber of an internal combustion engine with a view to determining an instant of start of combustion, characterized in that it comprises the following steps:
- low-pass filtering of the pressure-measurement signal in such a way as to obtain a filtered signal, and subtraction of the filtered signal from the pressure-measurement signal to obtain a difference signal,
- comparison of the difference signal with a predetermined threshold value,
- determination of the instant of start of combustion as an instant at which the difference signal attains the predetermined threshold value.

Advantageously the pass band of the low-pass filtering is broadened when the difference signal attains the predetermined threshold value.

As indicated hereinabove, this makes it possible to detect a second instant of start of combustion, after detection of a first instant of start of combustion.

BRIEF DESCRIPTION OF THE DRAWINGS

The invention will be better understood by means of the description hereinafter, given solely by way of example, and referring to the attached drawings, wherein.

DETAILED DESCRIPTION OF THE INVENTION

Figure 1:
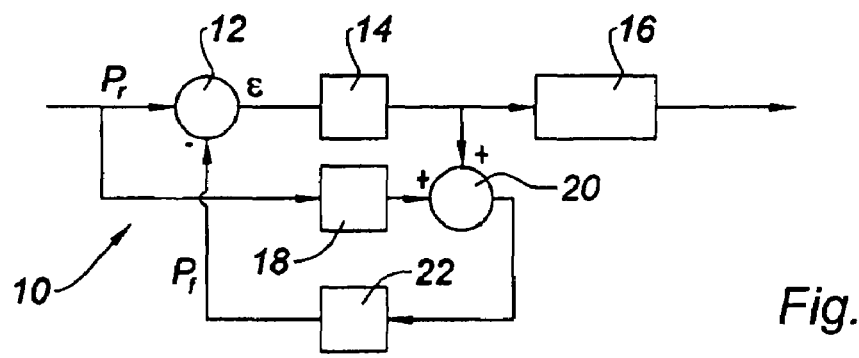
FIG. 1 schematically represents the general structure of a device according to the invention for processing a pressure-measurement signal.

Device 10 represented in FIG. 1 is adapted to receive at the input a pressure-measurement signal Pr from a combustion chamber of an internal combustion engine.

This device 10 is provided with a subtracter 12 to obtain, from pressure-measurement signal Pr and a filtered signal Pf, a first difference signal $\epsilon$ between these two signals.

Optionally, it is additionally provided with an element 14 for nonlinear processing of the first difference signal $\epsilon$, which will be described in detail hereinafter, to deliver a second difference signal.

This second difference signal, or in the absence of element 14 the first difference signal, is delivered to a device 16 for detection of an instant of start of combustion. This device 16 is provided with means for comparing the second difference signal with a predetermined threshold value $\sigma$, and with means for determining the instant of start of combustion as an instant at which the second difference signal attains the predetermined threshold value.

The filtered signal Pf is obtained from the pressure-measurement signal Pr by means of a low-pass filtering device provided with the following elements:

an amplifier 18 of gain $F=k_f$ applied to the pressure-measurement signal Pr, making it possible to regulate indirectly the cut-off pulsation that must be imposed on the pressure-measurement signal Pr by the low-pass filtering;

an adder 20, to add the result of the processing applied by nonlinear processing element 14 to the signal Pr amplified by amplifier 18, so as to amplify the signal Pr in such a way that the pass band of the low-pass filtering is broadened when the second difference signal attains the predetermined threshold $\sigma$; and a low-pass filter 22, whose parameters are predetermined, and which receives at the input the output signal of adder 20 and delivers at the output the filtered signal Pf delivered at the input of subtracter 12.

In one possible embodiment of the invention, device 10 as described hereinabove is implemented by means of digital elements.

In particular, low-pass filter 22 can be provided with digital means for first-order low-pass filtering, such as a digital Euler integrator that performs the following operation:

$$G(z) = \frac{T_e}{z-1}, \quad (1)$$

where Te is the sampling frequency, $z=e^{i2\pi fTe}$ is the transformation operator in z and f is the frequency.

As another example, the comparison means are provided with a digital comparator. The digital parameters of the low-pass filter and of the comparison means can be chosen in such a way as to generate only operations between integral numbers and/or in such a way as to replace every division of an integral number by a displacement of its binary representation to the right during processing of the pressure-measurement signal.

Nonlinear processing element 14 executes an operation that is defined, for example, by the following system of equations:

$$NL(x)=m \cdot x \text{ if } x \geq \sigma$$

$$NL(x)=0 \text{ if } x<\sigma \quad (2)$$

Thus the pass band of digital low-pass filter 22 depends on the amplification coefficient $k_f$ of amplifier 18 and on the output of nonlinear processing element 14, in such a way that, when the output of nonlinear processing element 14 is zero, or in other words when the first difference signal $\epsilon$ is below the predetermined threshold $\sigma$, the cut-off pulsation of low-pass filter 22 at $-3$ dB $\omega_{c1}$ is given by the following equation:

$$\omega_{c1} = \frac{1}{Te} \cdot \arccos\left[\frac{k_f^2 + 2k_f - 2}{2(k_f - 1)}\right]. \quad (3)$$

On the other hand, when the output of nonlinear processing element 14 is nonzero, or in other words when it amplifies the difference signal by a factor m, the cut-off pulsation of low-pass filter 22 at $-3$ dB $\omega_{c2}$ is given by the following equation:

$$\omega_{c2} = \frac{1}{Te} \cdot \arccos\left[\frac{(m+k_f)^2 + 2(m+k_f) - 2}{2(m+k_f - 1)}\right]. \quad (4)$$

The value of the threshold $\sigma$ is chosen such that it is exceeded by the first difference signal $\epsilon$ at the instant of start of combustion.

When this instant of start of combustion is detected, nonlinear processing element 14 causes broadening of the pass band of low-pass filter 22, in such a way that the first difference signal $\epsilon$ resulting from subtraction of the pressure-measurement signal Pr and of the filtered signal Pf is greatly reduced. In this way it is possible to detect a second instant of start of combustion as an instant at which the first difference signal $\epsilon$ once again attains the predetermined threshold value $\sigma$.

Figure 2A:
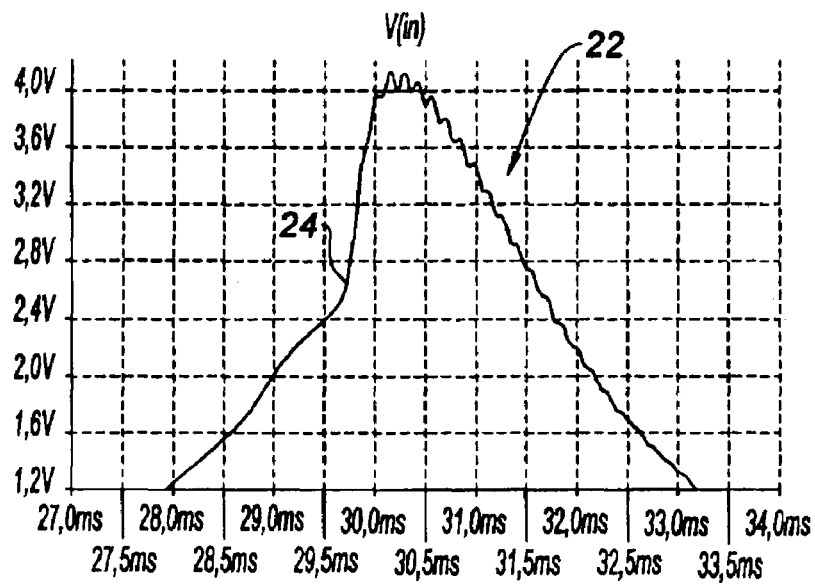
FIGS. 2a and 2b are diagrams representing the time evolution of a pressure-measurement signal in a combustion chamber of an internal combustion engine.

In FIG. 2a, curve 22 represents the time evolution of pressure-measurement signal Pr in the combustion chamber of the internal combustion engine. It is observed that the instant of start of combustion corresponds to the first instant at which the pressure-measurement signal intensifies abruptly, at point 24.

Figure 2B:
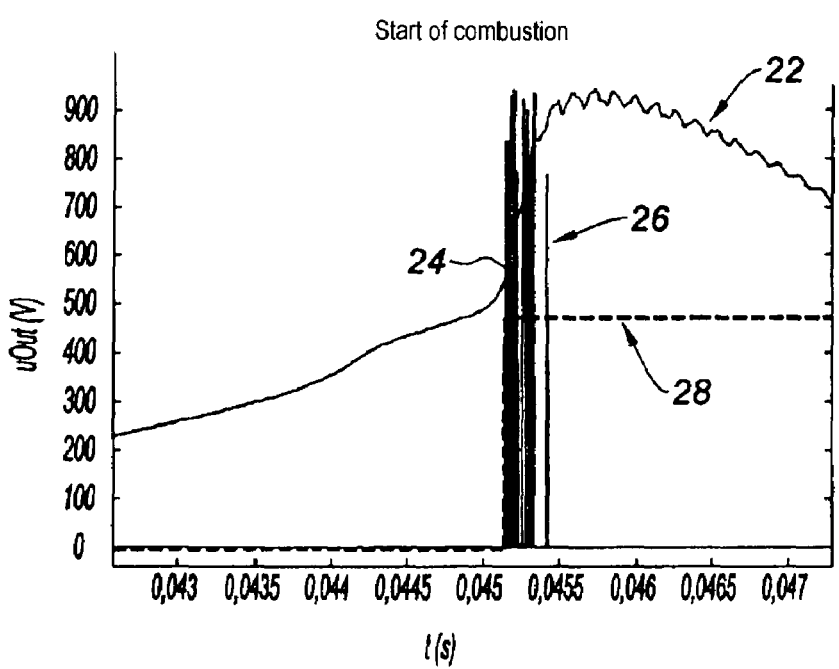

FIG. 2b represents a detail of curve 22 around point 24. Curve 26 corresponds to the time evolution of the first difference signal $\epsilon$, which exceeds the predetermined threshold value $\sigma$ for the first time at point 24. Finally, curve 28 represents a step signal that is delivered at the output of the processing device and that assumes a nonzero value when the instant of start of combustion is detected.

Figure 3:
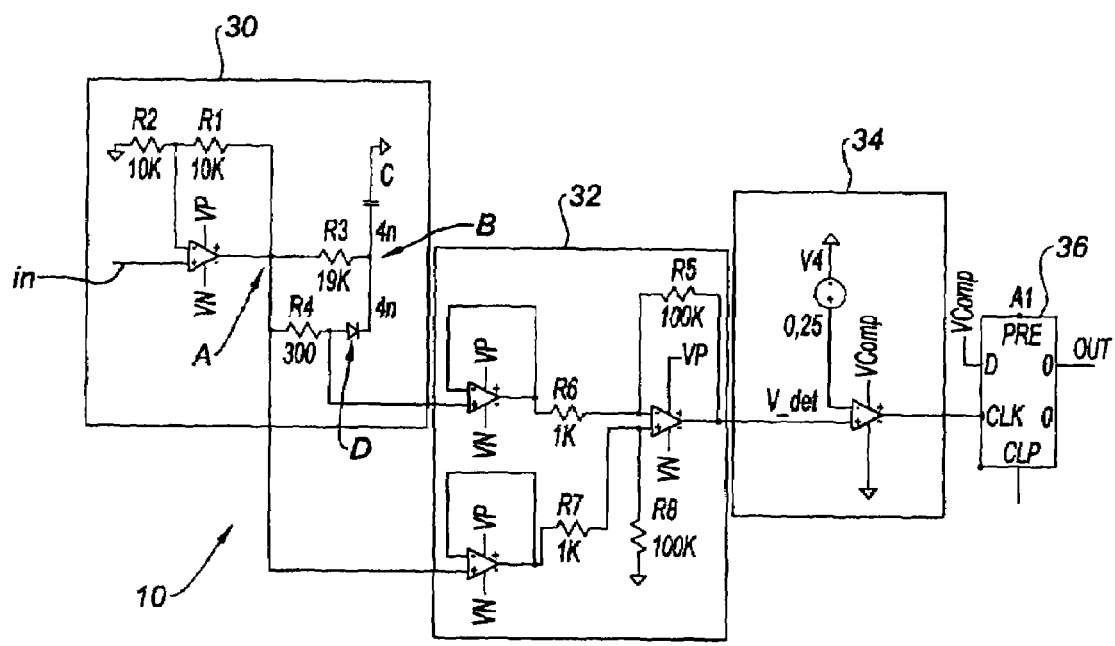
FIG. 3 schematically represents the structure of the device of FIG. 1 according to a possible analog embodiment.

In another possible embodiment of the invention represented in FIG. 3, processing device 10 is constructed by means of analog elements.

The assembly represented in this figure is provided with a first input stage 30, in which the voltage $V_A$ at a point A is related to the input voltage $V_{in}$ of the pressure-measurement signal by the following equation:

$$\frac{V_A}{V_{in}} = 1 + \frac{R_1}{R_2} = A_v, \quad (5)$$

where $R_1$ and $R_2$ are two values of resistors.

Between point A and a point B, first input stage 30 is provided with a circuit comprising a diode D disposed in parallel with a first-order low-pass filter (provided with a resistor $R_3$ associated with a capacitor C). This circuit constitutes a nonlinear processing element. In effect, when diode D is nonconducting, the voltage $V_B$ at point B is given by the following equation $$V_B = \frac{1}{1+sCR_3} V_A = A_v V_{in} \frac{1}{1+sCR_3} = A_v V_{filtered}, \quad (6)$$

where s is the Laplace operator and $V_{filtered}$ is the voltage of the filtered signal Pf.

The input signal can therefore be considered as having been amplified then filtered by a first-order low-pass filter, whose cut-off pulsation at −3 dB $\omega_{c1}$ is given by the following equation:

$$\omega_{c1} = \frac{1}{CR_3}. \quad (7)$$

If σ denotes the threshold voltage of diode D, the latter remains nonconducting as long as $V_A - V_B$ is below σ.

Now, $V_A - V_B = A_v(V_{in} - V_{filtered}) = A_v \epsilon$, represents the error between the input signal $V_{in}$ and the low-pass filtered signal $V_{filtered}$.

Diode D is then nonconducting as long as the value of ϵ is below a predetermined threshold and it becomes conducting when the error ϵ exceeds this predetermined value.

When the diode becomes conducting, the pass band of the low-pass filter is broadened by the presence of a resistor $R_4$ at the diode input and in parallel with resistor $R_3$ (disregarding the voltage drop at the diode terminals).

The diode therefore behaves as a nonlinear processing element whose function is to broaden the pass band of the low-pass filtering when the diode is conducting.

The threshold voltage σ of diode D is chosen in such a way that the instant at which the voltage at the diode terminals exceeds this threshold voltage for the first time corresponds to the instant of start of combustion (instant at which the large-amplitude high-frequency rise of the pressure-measurement signal occurs).

By means of the gain $A_v$ given by equation (5), it is possible to modify the value of the threshold σ. That makes it possible easily to regulate the processing device and consequently to make it very flexible and usable for every type of combustion.

If $I_D$ denotes the current passing through diode D, the voltage at the terminals of $R_4$ is proportional to this current:

$$V_{R4} = R_4 I_D. \quad (8)$$

In view of the considerations stated hereinabove, the instant of start of combustion also corresponds to the instant at which the voltage $V_{R4}$ exceeds a certain threshold value $s_v$. The voltage $V_{R4}$ at the terminals of $R_4$ is therefore measured and amplified by a differential amplifier in a second stage 32 of the assembly of FIG. 3.

If G denotes the gain of this differential amplifier, the output voltage of second stage 32 is then given by the following equation:

$$V_{det} = G \cdot V_{R4}. \quad (9)$$

This voltage Vdet is then compared with the threshold value $S_v = G \cdot s_v$ by an analog comparator in a third stage 34 of the assembly of FIG. 3.

Finally, the signal delivered at the output of third stage 34 constitutes the "clock" input of an analog flip-flop 36, whose input D is constantly set to logical value "1". This flip-flop must be reset to zero at the end of each thermodynamic cycle of the engine.

The output signal of analog flip-flop 36 is a step signal whose rising front corresponds to the instant of start of combustion in the thermodynamic cycle: it corresponds to signal 28 represented in FIG. 2b.

Figure 4:
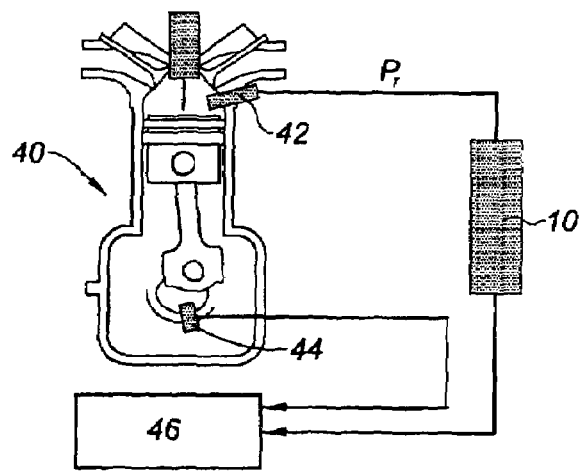
FIG. 4 schematically represents a combustion chamber equipped with a device according to the invention.

Finally, FIG. 4 represents a combustion chamber 40 of an internal combustion engine. This combustion chamber is associated with a processing device 10 such as described hereinabove, receiving at the input a pressure-measurement signal Pr delivered by a pressure sensor 42. The data delivered by processing device 10 and those delivered by a crank-angle sensor 44 disposed in combustion chamber 40 are transmitted to an electronic box 46 for subsequent processing operations.

As indicated hereinabove, device 10 for processing the pressure-measurement signal may be of analog or digital type.

It is clear that a device for processing a pressure-measurement signal such as described hereinabove makes it possible in simple manner to detect one or more instants of start of combustion of a combustion chamber of an internal combustion engine.

It will be noted, however, that the invention is not limited to the embodiments described hereinabove.

In fact, in particular, as a variant, low-pass filter 22, which in the digital embodiment executes a Euler integration, can be replaced by a low-pass filter that executes, for example, a trapezoidal integration based on the following transfer function:

$$G(z) = \frac{Te}{2} \cdot \frac{(z+1)}{(z-1)}. \quad (10)$$

The invention claimed is:

1. A device for processing a pressure-measurement signal of a combustion chamber of an internal combustion engine to determine an instant of start of combustion, comprising:
   a low-pass filter configured to obtain a filtered signal from an output signal of an adder that is configured to add an amplified signal of the pressure-measurement signal and an output of a nonlinear processing element;
   means for subtracting the filtered signal from the pressure-measurement signal to obtain a difference signal;
   means for comparing the difference signal with a predetermined threshold value; and
   means for determining the instant of start of combustion as an instant at which the difference signal attains the predetermined threshold value.

2. A device for processing a pressure-measurement signal according to claim 1, wherein the nonlinear processing element is disposed so as to broaden a pass band of the low-pass filter when the difference signal attains the predetermined threshold value.

3. A device for processing a pressure-measurement signal according to claim 2, wherein the low-pass filter includes analog means for first-order low-pass filtering, and wherein the nonlinear processing element includes a diode disposed in parallel with the low-pass filter.

4. A device for processing a pressure-measurement signal according to claim 1, wherein the low-pass filter includes digital means for first-order low-pass filtering, and wherein the means for comparing includes a digital comparator.

5. A device for processing a pressure-measurement signal according to claim 4, wherein the low-pass filter includes a digital Euler integrator.

6. A device for processing a pressure-measurement signal according to claim 1, wherein digital parameters of the low-pass filter and of the means for comparing are chosen such that only operations between integral numbers are generated during processing of the pressure-measurement signal.

7. A device for processing a pressure-measurement signal according to claim 6, wherein the digital parameters of the low-pass filter and of the means for comparing are additionally chosen such that any division of an integral number is replaced by displacement of its binary representation to the right during processing of the pressure-measurement signal.

8. A device for processing a pressure-measurement signal according to claim 1, further comprising an analog circuit of comparator type to deliver a step signal that changes from a zero value to a non-zero value when the difference signal exceeds the predetermined threshold value.

9. A method for processing a pressure-measurement signal of a combustion chamber of an internal combustion engine to determine an instant of start of combustion, comprising:
    low-pass filtering an output signal that is obtained by adding an amplified signal of the pressure-measurement signal and an output of a nonlinear processing element so as to obtain a filtered signal;
    subtracting the filtered signal from the pressure-measurement signal to obtain a difference signal;
    comparing the difference signal with a predetermined threshold value; and
    determining the instant of start of combustion as an instant at which the difference signal attains the predetermined threshold value.

10. A method for processing a pressure-measurement signal according to claim 9, wherein a pass band of the low-pass filtering is broadened when the difference signal attains the predetermined threshold value.

* * * * *